April 25, 1933.  H. F. DRURY  1,905,997
ANTISKID DEVICE
Filed Aug. 14, 1930
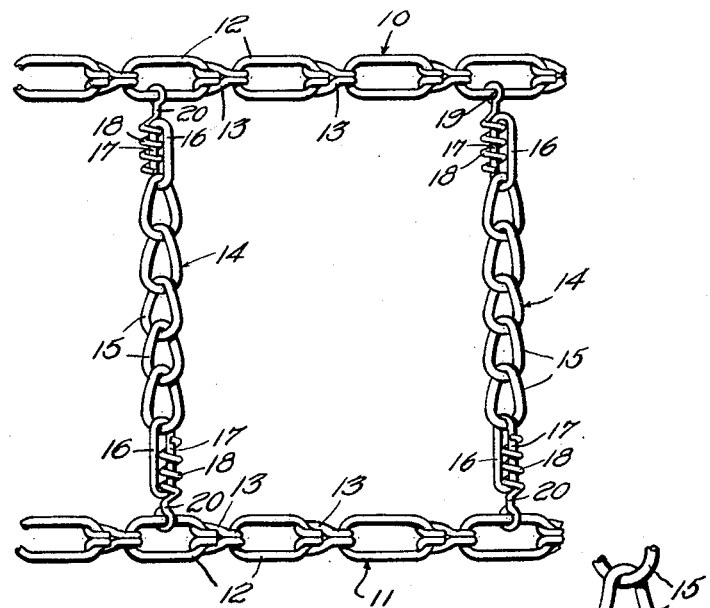
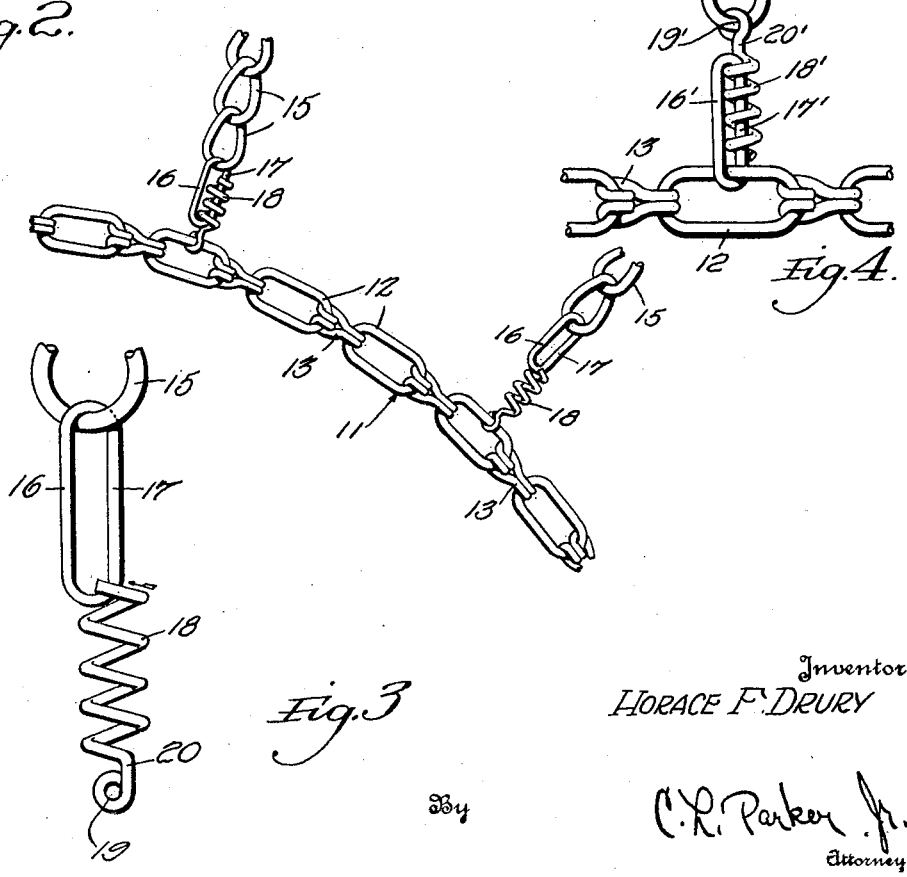
Inventor
HORACE F. DRURY
By C. R. Parker Jr.
Attorney Patented Apr. 25, 1933

1,905,997

UNITED STATES PATENT OFFICE

HORACE F. DRURY, OF WASHINGTON, DISTRICT OF COLUMBIA

ANTISKID DEVICE

Application filed August 14, 1930. Serial No. 475,295.

This invention relates to an improved antiskid device for vehicle wheels of the type wherein spaced side members are arranged around the sides of the tire carried by the wheel and are connected by a plurality of transverse members arranged across the tire. The invention particularly relates to a novel method of assembling the device whereby the transverse members will be detachably connected to the side members and to novel means for permitting the detachable connection between the transverse and side members of the device.

Heretofore it has been customary in antiskid devices to securely connect the transverse members to the side members, thus providing a device wherein replacement of broken transverse members or parts thereof was made exceedingly difficult due to this secure engagement between the transverse and side members. Consequently, such replacements were seldom made and the devices were ordinarily used only until a sufficient number of the transverse members had broken to render the devices useless. When these transverse members become broken, the hanging portions thereof are thrown against the fender and other parts of the vehicle and until removed are a constant source of noise and annoyance to the occupants of the vehicle, as well as the public generally.

It is a known fact that the side members of an anti-skid device will greatly outlast the transverse members and if it is possible to quickly replace worn transverse members at little cost, the device will last indefinitely.

Accordingly, it is an object of this invention to provide an anti-skid device wherein the transverse members are detachably connected to the side members whereby replacement of worn transverse members may be quickly and easily effected.

Another object is to provide a device of the character referred to wherein the parts of the transverse members when broken will quickly automatically detach themselves from the side members and fall on the roadway, thus eliminating noises due to the striking of the broken transverse members against portions of the vehicle.

A further object is to provide a novel device for detachably securing the transverse members to the side members.

A further object is to provide novel means in the form of a spiralled member for detachably connecting the transverse members to the side members whereby upon breakage of the transverse members the latter will follow the loops of the spiralled member until disconnected therefrom.

A further object is to provide a novel transverse member which may be quickly secured to or detached from the side members.

A further object is to provide a spiralled member connecting each end of the transverse members to the side members and to extend the spirals of each spiralled member in the same direction whereby the transverse members will not accidentally become disengaged from the side members.

A further object is to provide a novel method of assembling the anti-skid device, wherein the spiralled members are secured to the side members and the transverse members are arranged in proper position by turning the transverse members upon the loops of the spiralled members.

A further object is to provide a modified form of device wherein the spiralled members are carried by the transverse members, means being carried by the side members to receive the spiralled members in detachable engagement.

A further object is to provide a novel method of assembling the modified form of the device.

Other objects and advantages of the invention will become apparent from the following description.

In the drawing I have shown preferred embodiments of my invention. In this showing, Figure 1 is a plan view of a portion of my anti-skid device with the transverse members connected between the side members, Figure 2 is a side elevation of a portion of the device showing the transverse members broken, one of the latter being at its point of disengagement from the spiralled member, Figure 3 is an enlarged detail view of one spiralled member showing a portion of a transverse member in position either to be turned upon the spiralled member or to become disconnected from the spiralled member, and Figure 4 is a plan view of a portion of a modified form of device.

Referring to the drawing the numerals 10 and 11 indicate respectively side members of an anti-skid device and each side member preferably comprises a chain formed of a plurality of relatively large links 12 connected by smaller links or hooks 13.

The side members 10 and 11 are adapted to be arranged on opposite sides of a tire carried by a vehicle wheel, as will be understood, and transverse members indicated as a whole by the numeral 14 are adapted to be connected at spaced intervals between the side members and to extend across the tire. Each transverse member as shown in Figures 1 to 3, comprises a plurality of connected links 15 which engage the surface over which the vehicle is being driven, and includes connecting members 16, preferably secured to each end link 15.

In prior constructions it has been customary to simply connect the end links 15 of the transverse member with the side members by means of a hook or the like whereby a secure connection was obtained, no attempt being made to detachably connect the transverse members to the side members. In my construction I connect to each end link 15, the link 16, or the like, having at least one relatively elongated side 17. The side of each link 16, opposite the side 17 may be parallel to and equal in length to the latter side, but is not necessarily so, as will be pointed out.

At spaced intervals the side members 10 and 11 have rigid spiralled members 18 connected thereto and for this purpose one end of each spiralled member is provided with an eye 19 through which extends a portion of one of the links 12. The loops or spirals of each spiralled member 18 are extended in the same direction for a purpose to be described, and the elongated portion 17 of each member 16 is turned upon its associated spiralled member until the transverse member is properly positioned between the side members. Between the eye 19 and the first loop of each spiralled member, a substantially straight portion 20 is provided, preferably formed integral with the spiralled member, for a purpose to be described.

In Figure 4 I have shown a modified form of the device wherein the member 16' which corresponds to the member 16 is carried by the links 12 of the side members, and the spiralled member 18' which corresponds to the member 18, is secured to the end link of the transverse member by means of the eye 19'.

The operation of the device is as follows:

In assembling the form of the device shown in Figures 1 to 3, the spiralled members 18 are secured in their proper position to selected links 12 of the side members 10 and 11, with the spiralled members secured to the member 10 oppositely disposed from the spiralled members secured to the member 11, as shown in Figure 1. One of the transverse members 14 having one of the members 16 connected to each end thereof, is then detachably secured between each pair of oppositely disposed spiralled members.

To secure the transverse members in proper position one end of one transverse member is secured to one of the spiralled members by turning the member 16 upon the spiralled member until the straight portion 20 of the spiralled member is reached. When the member 16 last referred to is in proper position the elongated portion 17 thereof will extend through the loops of the spiralled member and further outward movement of the member 16 is prevented by engagement of the latter with the straight portion 20.

After one end of the transverse member has been secured as described, the transverse member is twisted according to the number of loops in the spiralled member to which the opposite end of the transverse member is to be secured and when twisted sufficiently the member 16 on said opposite end is turned upon the last named spiralled member until it reaches the straight portion 20 of the spiralled member. As the member 16 last referred to turns upon the spiralled member, the transverse member will untwist itself and when the proper position has been reached the links of the transverse member will be untwisted. The proper position of the transverse members is flat whereby the links 15 may easily engage the surface over which the vehicle is being driven, and it is desirable that when this flat position has been reached, each member 16 will be in engagement with the straight portion 20 of its associated spiralled member.

The above operation is continued with each transverse member until the entire device is assembled. However, it will be obvious that the device may also be assembled by securing all the transverse members to one of the side members and then securing the other side member to the transverse members.

The loops of the spiralled members connected to each end of the transverse members are preferably extended in the same direction in order to prevent accidental disengagement of the transverse members when the device is not in use. For example, if the loops of oppositely disposed spirals were extended in opposite directions it would be easy to remove a transverse member by turning same whereby the members 16 would move inwardly toward each other until disconnected, but with my arrangement movement of one member 16 inwardly tends to move the other member 16 of the same transverse member, outwardly, thus requiring two separate operations to disconnect the transverse member. These two operations may be deliberately performed if it is desired to remove a transverse member, but it is unlikely that a transverse member will accidentally become disengaged.

In Figure 2 I have shown two of the transverse members broken, a condition which is often present during use of the device on vehicles. When the device rotates with the wheel and a transverse member becomes broken, it is obvious that centrifugal force will urge the member 16 to turn upon the loops of the spiral until it becomes disengaged. The pieces of the broken transverse member will fall upon the surface over which the vehicle is travelling, and noises formerly resulting from contact of the broken members with portions of the vehicle will be eliminated. In actual practice it has been found that but few revolutions of the vehicle wheel are necessary to disengage the broken transverse members.

After a transverse member has become broken and disconnected from the device, a new transverse member including the members 16 may be quickly and easily connected in position to the spiralled members which do not become disengaged from the side members in this form of the device.

In the form of the device shown in Figure 4, it will be obvious that when a transverse member breaks, the spiralled members 18' secured to the broken transverse members will be lost with the broken transverse member when the latter becomes disengaged from the members 16'. In this form of the device it is also easy to replace broken transverse members. It is only necessary to provide a transverse member having the spiralled members 18' at each end whereby each spiralled member may be connected to its associated member 16' by turning the spiralled members into proper position.

I have shown each spiralled member as containing approximately 3½ loops, but the number of loops may be more or less than illustrated. It is preferred that only a sufficient number of loops be formed on the spiralled member to permit ease of assembly of the device and ready disengagement of the broken transverse members, while not permitting accidental disengagement of the transverse members.

It is also preferred that when viewing the device as shown in Figure 1, each spiralled member should be mounted upon the right hand side of the members 16 secured to the side member 11 and upon the left hand side of the members 16 secured to the side member 10, in order that a proper balance for the transverse members may be maintained. It has been found however, that the device will operate successfully regardless of which side of the members 16, the spiralled members are mounted upon.

As hereinbefore stated the sides of the members 16 are preferably parallel, but need not be so, as the device will operate perfectly so long as one elongated side is provided and means are provided to insure engagement of the spiralled member with the elongated side, that is, to prevent the elongated side from merely sliding into and out of engagement with the spiralled member instead of following the loops of the spiralled member by a turning movement.

It will be apparent that I have provided a device which may be quickly and easily assembled by a screw or substantially rotary action of the transverse members, in which broken transverse members may be readily replaced at small cost, and which insures disengagement of broken transverse members.

It is to be understood that the forms of my invention herewith shown and described and the methods of assembly described are to be taken as preferred examples of the same, and that various changes in the shape, size, arrangements of parts and in the manner of carrying out the methods, may be resorted to without departing from the spirit of the invention, or the scope of the subjoined claims.

I claim:

1. An anti-skid device comprising a pair of spaced side members, a transverse member adapted to be connected between said side members an elongated member associated with said transverse member, and high pitch spiral means connected to one of said side members and having operative engagement with said elongated member to detachably connect said transverse member to said spiral means, the connection being such that upon breakage of said transverse member the portion of the latter between the breaking point and said last mentioned side member will automatically become unscrewed from the latter.

2. An anti-skid device comprising a pair of spaced side members, a transverse member adapted to be connected between said side members, an elongated member associated with said transverse member, and a spiralled member connected to one of said side members and having spiralled detachable engagement with said elongated member with the axis of the spiral lying substantially coincident with said elongated member.

3. An anti-skid device comprising a pair of spaced side members, a transverse member adapted to be connected between said side members, a link associated with said transverse member and having at least one substantially elongated side, and a spiralled member connected to one of said side members and having spiralled detachable engagement with the elongated side of said link with the axis of the spiral lying substantially coincident with said elongated side.

4. An anti-skid device comprising a pair of spaced side members, a transverse member adapted to be connected between said side members, and a spiralled member connected to each of said side members, each spiralled member having spiralled detachable engagement with said transverse member, and having its spirals extending in the same direction each spiral having its axis lying substantially parallel to the portion of the transverse member to which it is connected.

5. A device for detachably securing a transverse member of an anti-skid device to the side members of the anti-skid device comprising a member adapted to be connected to said transverse member and having an elongated portion to form a continuation thereof, and a spiralled member having spiralled detachable engagement with said elongated portion with the latter extending substantially axially with respect to the spiral member.

6. In an anti-skid device, a transverse member comprising a plurality of connected links and having an elongated member secured to and forming a continuation of each end thereof, and a spiralled member spirally and detachably secured to each elongated member with the latter extending substantially axially with respect to said spiralled member.

7. An anti-skid device comprising a pair of spaced side members, a transverse member extending between said side members, and releasable spiral means arranged substantially in alinement with said transverse member for connecting each end thereof to said side members, each spiral means being of sufficiently high pitch whereby the adjacent portions of the transverse member are freely rotatable with respect thereto under the influence of centrifugal force upon breakage of said transverse member to become released from said screw means.

8. In a device of the character described, a side member and a transverse member forming sections of an anti-skid device, an elongated element carried by one section and extending toward the other section and provided adjacent the second named section with an offset portion, and a securing element connected to the last named section and having a portion inclined with respect to the elongated element and contacting with the offset portion thereof to prevent direct linear movement of said elements away from each other but operative for guiding said elements in a different relative movement under the influence of centrifugal force upon breakage of said transverse member for effecting separation of said elements.

9. In an anti-skid device, a side member, a transverse member, an elongated element carried by the end of said transverse member adjacent and extending toward said side member and provided adjacent said side member with an offset portion, and a securing element connected to said side member and having a portion inclined with respect to the elongated element and contacting with the offset portion thereof to prevent direct linear movement of said elongated element away from said securing element but operative for guiding said elongated element in a different movement under the influence of centrifugal force upon breakage of said transverse member for effecting separation of said elongated element from said securing element.

In testimony whereof I affix my signature.

HORACE F. DRURY.